(12) United States Patent
Ruffa

(10) Patent No.: US 7,496,246 B1
(45) Date of Patent: Feb. 24, 2009

(54) RUGGEDIZED FIBER OPTIC SOUND VELOCITY PROFILER

(75) Inventor: Anthony A. Ruffa, Hope Valley, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 902 days.

(21) Appl. No.: 10/627,105

(22) Filed: Jul. 24, 2003

(51) Int. Cl.
*G02B 6/00* (2006.01)
(52) U.S. Cl. ......................................... 385/13
(58) Field of Classification Search ............ None
See application file for complete search history.

(56) References Cited

U.S. PATENT DOCUMENTS

| | | | | |
|---|---|---|---|---|
| 4,971,420 | A * | 11/1990 | Smith | 385/107 |
| 5,125,062 | A * | 6/1992 | Marlier et al. | 385/101 |
| 5,212,755 | A * | 5/1993 | Holmberg | 385/107 |
| 5,495,542 | A * | 2/1996 | Shimomura et al. | 382/254 |
| 5,495,547 | A | 2/1996 | Rafie et al. | |
| 5,734,623 | A * | 3/1998 | Ruffa | 367/128 |
| 6,591,046 | B2 * | 7/2003 | Stottlemyer | 385/103 |

* cited by examiner

*Primary Examiner*—Sung H Pak
*Assistant Examiner*—Hoang Tran
(74) *Attorney, Agent, or Firm*—James M. Kasischke; Michael P. Stanley; Jean-Paul A. Nasser

(57) ABSTRACT

The present invention relates to an optical fiber cable for use with a system for determining a velocity profile of sound in a medium. The optical fiber cable comprises an inner layer of strength members, an outer layer of strength members, and at least one tube containing at least one optical fiber incorporated into the outer layer. The at least one optical fiber has a plurality of Bragg grating sensors spaced along its length.

11 Claims, 2 Drawing Sheets

RUGGEDIZED FIBER OPTIC SOUND VELOCITY PROFILER

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to a system for establishing the sound velocity profile of a medium, and more particularly to a cable for use in such a system.

(2) Description of the Prior Art

Undersea cables containing optical fibers are well known in the art. U.S. Pat. No. 5,125,062 to Marlier et al. relates to an undersea telecommunications cable having optical fibers. The undersea cable has an optical fiber embedded in material filling a tube which itself lies inside a helical lay of metal wires having high mechanical strength, the interstices between the wires of the helical lay being filled with a sealing material. The helical lay is surrounded by an extruded sheath made of an electrically insulating and abrasion resistant material, and for the purposes of remotely powering equipment interposed on the cable, the cable includes conductive means either belonging to the helical lay or surrounding it, which conductor means is surrounded by the sheath.

U.S. Pat. No. 4,971,420 to Smith relates to an optical fiber cable for submarine use which has a core surrounded by a layer of strength members which include both wires and laser welded metallic tubes containing the optical fibers.

U.S. Pat. No. 5,212,755 to Holmberg relates to an armored fiber optic cable having both fiber optics and armor wires located outside the cable core in position where the fiber optics experience low strain when the cable is under stress. In one embodiment, metal armor wires and optical fibers embedded in metal tubes are arrayed in one or more layers about and outside the cable core. In another embodiment, KEVLAR armor wires and optical fibers embedded within a hard composite shell are arrayed in one or more layers about and outside the cable core, and a layer of KEVLAR armor is provided surrounding the one or more layers. In each of the embodiments, the strains that the fiber optics experience due to core stresses and due to core residual strain is materially reduced over other armored fiber optic cables.

U.S. Pat. No. 5,495,547 to Rafie et al. is directed to a well logging cable including first conductor elements, each of the first elements consisting of a steel wire surrounded by copper strands and covered in an electrically insulating material, and at least one second conductor element including at least one optical fiber enclosed in a metal tube, copper strands surrounding the tube and strands covered by the electrically insulating material. The first elements and the at least one second element are arranged in a central bundle. The second conductor element is positioned within the bundle so as to be helically wound around a central axis of the bundle. The bundle is surrounded by armor wires helically wound externally to the bundle.

The velocity of sound through a medium depends upon a number of factors including temperature, pressure and density. In the case where the medium is seawater, sound velocity also depends on the salinity of the seawater. In many situations, it is necessary to obtain accurate measurements of sound velocity through a medium along an axis, such as obtaining a profile of sound velocity of a water column. For example, sound velocity measurements or profiles are needed for accurate sonar location of objects on the sea bottom in recovery operations or for accurate bottom mapping.

U.S. Pat. No. 5,734,623 to Ruffa illustrates a fiber optic cable, coated to increase its sensitivity to acoustic pressure, which may be towed through a medium. The optical fiber contains Bragg grating sensors at regular intervals along its length. A steerable array of transducers sends a pulse of sound in the direction of the optical cable while broadband pulses of light are directed down the optical fiber. The pulses of light are selectively reflected back according to the spacing between the Bragg gratings. The sound pressure field causes a local strain in the fiber, thus changing the wavelength of the grating. The sound velocity profile along the length of the optical cable is computed by measuring the amount of time necessary for successive Bragg gratings to respond to the acoustic pressure associated with the advancing wave front of the acoustic pulse.

Although an instrumented tow cable that continuously measures the sound velocity profile has the potential to significantly improve sonar performance, it has not yet been realized in fleet sonar systems. One of the main obstacles is to design such a system that is sufficiently rugged to survive deployment and retrieval through handling systems at high speeds which lead to high tensions. This requirement alone rules out attaching devices to the cable or embedding devices into the protective jacket surrounding the cable such as thermisters to measure the temperature profile of the ocean. For this reasons, fiber optic Bragg grating-based sensors are ideal, since they require no wires or preamps that can be crushed; the fiber is the sensor.

SUMMARY OF THE INVENTION

Accordingly, it is an object of the present invention to provide an optical fiber cable which is sufficiently rugged to survive deployment and retrieval.

It is a further object of the present invention to provide an optical fiber cable which can be used in a fiber optic sound velocity profiler.

The foregoing objects are achieved by the optical fiber cable of the present invention.

An optical fiber cable in accordance with the present invention broadly comprises at least one inner layer of strength members, an outer layer of strength members, and at least one tube containing at least one optical fiber incorporated into said outer layer.

Further, in accordance with the present invention, a system for determining a velocity profile of sound in a medium is provided. The system broadly comprises an optical fiber cable suspended in the medium, the optical fiber cable having at least one inner layer of strength members, an outer layer of strength members, and at least one tube containing at least one optical fiber incorporated into said outer layer, the at least one optical fiber having a plurality of Bragg grating sensors along its length, an optical pulse generator for sending an optical pulse into the optical cable, an acoustic pulse generator for sending an acoustic pulse generally along the length of the optical fiber cable, the acoustic pulse causing local strain in the optical cable, the local strain causing the Bragg grating sensors in the vicinity of the strain to selectively reflect the optical pulse back in the direction of the optical pulse generator, a timer for receiving the reflected optical pulse and measuring a time of arrival of the reflected optical pulse, and a processor for computing the sound velocity profile as a function of the time of arrival.

Other details of the ruggedized cable of the present invention, as well as other objects and advantages attendant thereto, are set forth in the following detailed description and the accompanying drawings wherein like reference numerals depict like elements.

DESCRIPTION OF THE PREFERRED EMBODIMENT(S)

Figure 1:
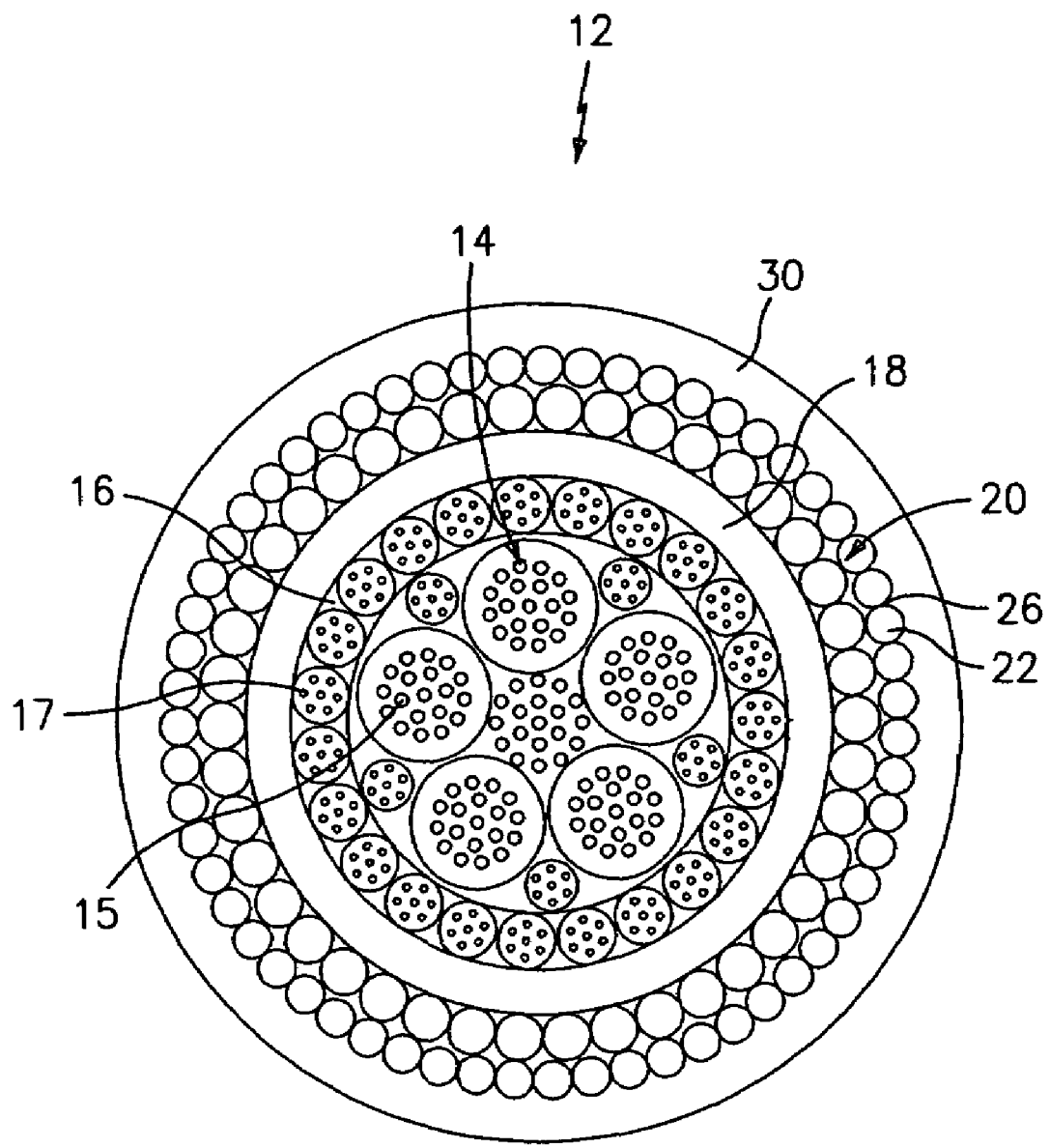
FIG. 1 is a cross sectional view of an optical fiber cable in accordance with the present invention.

FIG. 1 illustrates a ruggedized optical fiber cable 12 for use in a sound velocity profiler system. The cable 12 has an inner layer 14 of strength members 15, with each strength member 15 preferably being formed by a plurality of steel wires encased in a plastic tube. The cable 12 further has one or more additional layers 16 of strength members 17 with each strength member 17 preferably formed by a plurality of steel wires encased within a plastic tube. Surrounding the additional layer(s) 16 is a jacket 18 preferably formed from a plastic material such as polyurethane. If desired, each of the layers 14 and 16 may be wrapped with a tape-like material which acts as a water block.

Figure 3:
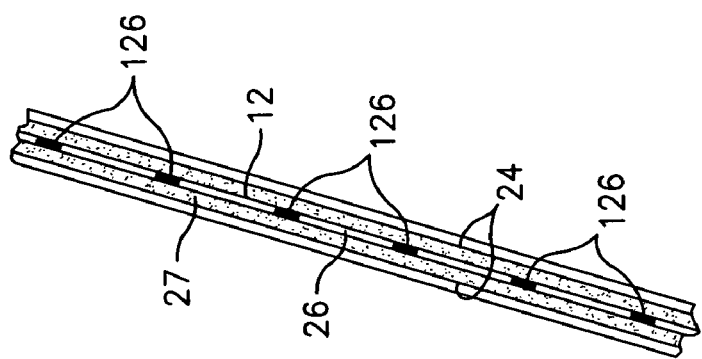
FIG. 3 is a representation of a portion of the optical fiber cable of FIG. 1.

One or more outer layers 20 of strength members 22 surround the jacket 18. Each of the layers 20 includes a plurality of strength members 22 having an outer diameter. Each strength member 22 may also comprise a plurality of steel wires encased within a plastic tube (e.g., "steel lite" as mentioned below). Incorporated into at least one of the outer layers 20 is at least one tube 24, preferably formed from a stainless steel material. Each tube 24 preferably has an outer diameter identical to the outer diameter of strength members 22. Alternatively, the diameter can be slightly smaller, then built up to the diameter of 22 with a polymer coating. Incorporated into each tube 24 is one or more optical fibers 26. The optical fiber(s) 26 preferably float within a gel material 27. As shown in FIG. 3, a plurality of Bragg grating sensors 126 are incorporated into and regularly spaced along the length of one or more of the optical fiber(s) 26.

The outermost outer strength layer 20 is in turn surrounded by a primary outer jacket 30. The jacket 30 may be formed from any suitable material known in the art such as a polyurethane material.

If desired, each tube 24 may be placed between adjacent ones of said strength members 22.

Figure 2:
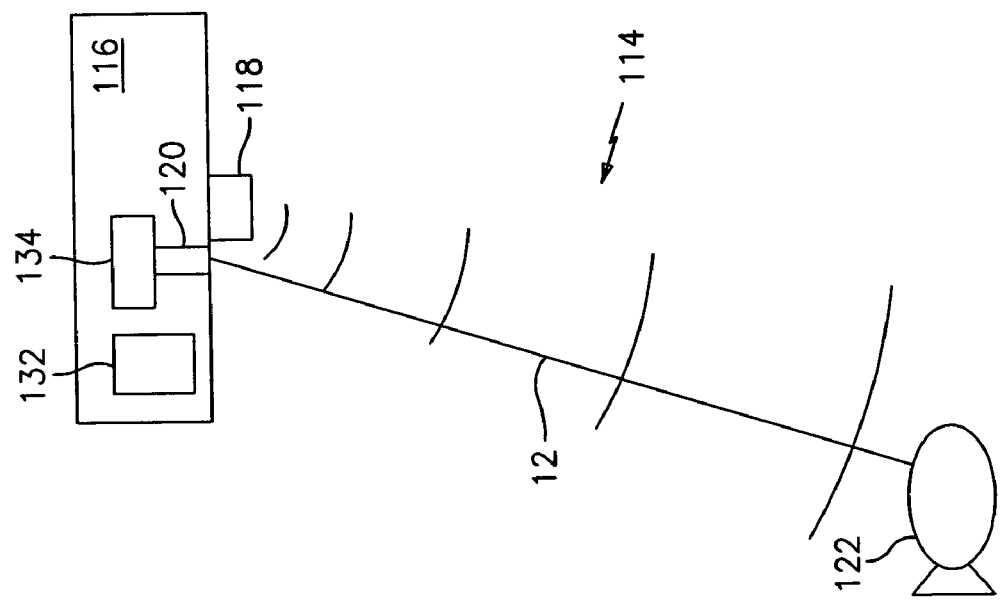
FIG. 2 is a schematic representation of a sound velocity profiler system.

The optical fiber cable 12 of the present invention may be used in a sound velocity profiler system 100 such as that shown in FIG. 2. An optical fiber cable 12 is towed through a medium 114 from a platform 116. A steerable array of transducers 118 is attached to platform 116. The array 118 is capable of sending a bean of sound, or acoustic pulse, having a specified frequency and amplitude in a desired direction. Optical source 120 is optically connected to cable 12 for sending pulses of light into cable 10. FIG. 2 also illustrates a heavy body 122 attached to the end of cable 12 which aids cable 12 in reaching a specified depth. In operation, array 118 sends an acoustic pulse in the direction of cable 12.

As shown in FIG. 3, a series of Bragg grating sensors 126, well known in the art, are regularly spaced along the cable 12. The advancing pressure front of the acoustic pulse causes local strain in cable 12, thus changing the grating wavelength. A light pulse from optical source 120 is selectively reflected back along the length of cable 12 according to the local strain in cable 12. The sound velocity in medium 114 is computed by processor 132 as a function of the amount of time necessary for successive grating sensors to respond to the advancing pressure front as measured by timer 134. The time of maximum response for each Bragg grating sensor is recorded and this time is divided by the distance to the Bragg grating sensor to obtain the velocity through the water column to the Bragg grating. The amplitude of the acoustic pulse can be increased as necessary to produce sufficient strain for activating sensors 126.

Where broadcasting acoustic noise is a concern, the frequency of the acoustic pulse can be high enough such that it is attenuated at large ranges. In order to direct the acoustic pulse in the direction of cable 12, an estimate of towing angle is needed. The towing angle may be determined using the equation set forth in U.S. Pat. No. 5,734,623 which is hereby incorporated by reference herein. While such factors as cable diameter, weight, density, and drag coefficient can be accurately determined, the exact tow speed may not be easily obtained. An estimated speed may be used to calculate an estimated critical angle. The acoustic pulse can then be steered about the estimated critical angle until the response from sensors 126 is maximized at the true towing angle. It is to be noted that in determining the true towing angle in this way, an accurate measure of the tow speed is also provided.

The cable described hereinbefore was tested under conditions that simulate Navy handling systems. It was cycled over a sheave for 750 cycles for tensions up to 22,500 lbs. with no detrimental effects to the fibers. This proves the feasibility of incorporating Bragg grating-based sensors on one or more fibers contained in a tube located on the outer strength member layer of a tow cable. This is an improvement over the construction shown in U.S. Pat. No. 5,734,623, which involves locating the tube containing fibers in the center of the tow cable. When the fibers are located in the center the received acoustic pulse can be degraded while passing through the acoustically complex cable structure.

If desired, the steel wires forming the strength members may be replaced by an armored fiber, one version of which is known commercially as "Steel-Lite", a trademark of the Rochester Corporation. The outer diameter of the Steel-Lite cable would be the same as the outer diameter of the steel armor wire it replaces.

It is apparent that there has been provided in accordance with the present invention a ruggedized fiber optic sound velocity profiler which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. An optical fiber cable comprising:
   an inner layer of strength members wherein each strength member of said inner layer of strength members is a plurality of steel wires encased in a plastic tube;
   an outer layer of strength members wherein each strength member of said outer layer of strength members is a plurality of steel wires encased in a plastic tube;
   at least one tube containing at least one optical fiber incorporated into said outer layer and adjacent to at least one strength member of said outer layer of strength members wherein a diameter of said at least one tube is smaller than a diameter of each strength member of said outer layer; and a polymer coating encasing each said at least one tube such that the diameter of said tube approximates the diameter of each strength member of said outer layer.

2. An optical fiber cable according to claim 1, wherein said at least one tube is formed from stainless steel and has an internal gel and said optical fiber is surrounded by said gel and floats within said gel.

3. An optical fiber cable according to claim 1, further comprising Bragg grating sensors spaced along a length of said optical fiber cable.

4. An optical fiber cable according to claim 1, further comprising a first jacket surrounding said inner layer and a second jacket surrounding said outer layer.

5. An optical fiber cable according to claim 4, further comprising each of said first and second jackets being formed from a plastic material.

6. A system for determining a velocity profile of sound in a medium comprising:

an optical fiber cable suspended in the medium, the optical fiber cable having an inner layer of strength members wherein each strength member of said inner layer of strength members is a plurality of steel wires encased in a plastic tube, an outer layer of strength members wherein each strength member of said outer layer of strength members is a plurality of steel wires encased in a plastic tube, and at least one tube containing at least one optical fiber incorporated into the outer layer and adjacent to at least one strength member of said outer layer of strength members wherein a diameter of said at least one tube is smaller than a diameter of each strength member of said outer layer and a polymer coating encasing each said at least one tube such that the diameter of said tube approximates the diameter of each strength member of said outer layer;

said at least one optical fiber having a plurality of Bragg grating sensors spaced along its length;

an optical pulse generator for sending an optical pulse into the optical cable;

an acoustic pulse generator for sending an acoustic pulse generally along the length of the optical fiber cable, the acoustic pulse causing local strain in the optical cable, the local strain causing the Bragg grating sensors in the vicinity of the strain to selectively reflect the optical pulse back in the direction of the optical pulse generator;

a timer for receiving the reflected optical pulse and measuring a time of arrival of the reflected optical pulse; and a processor for computing the sound velocity profile as a function of the time of arrival.

7. A system according to claim 6, wherein the acoustic pulse generator is a transducer array.

8. A system according to claim 6, wherein the transducer array is a steerable array for accurately directing the acoustic pulse along the length of the optical fiber.

9. A system according to claim 6, wherein the optical pulse generator is a pulsed laser.

10. A system according to claim 6, further comprising a platform for suspending the optical cable and for housing the acoustic pulse generator.

11. A system according to claim 10, further comprising a weighted body attached at an end of the optical fiber cable opposite the platform, the weighted body assisting in extending the optical fiber cable from the platform.

* * * * *